(12) United States Patent
Lee et al.

(10) Patent No.: US 10,463,021 B2
(45) Date of Patent: Nov. 5, 2019

(54) ACCESSORY ASSEMBLY FOR COUPLING A UNIT TO AN ANIMAL BAND

(71) Applicant: Mars, Incorporated, McLean, VA (US)

(72) Inventors: Kyu Sang Lee, San Jose, CA (US); Robert Mott, La Quinta, CA (US); Kevin R Lloyd, San Carlos, CA (US)

(73) Assignee: MARS, INCORPORATED, McLean, VA (US)

( * ) Notice: Subject to any disclaimer, the term of this patent is extended or adjusted under 35 U.S.C. 154(b) by 95 days.

(21) Appl. No.: 15/291,872

(22) Filed: Oct. 12, 2016

(65) Prior Publication Data
US 2018/0098525 A1 Apr. 12, 2018

(51) Int. Cl.
*A01K 27/00* (2006.01)
*F16B 2/12* (2006.01)

(52) U.S. Cl.
CPC .......... *A01K 27/001* (2013.01); *A01K 27/008* (2013.01); *A01K 27/009* (2013.01); *F16B 2/12* (2013.01)

(58) Field of Classification Search
CPC .. A01K 27/001; A01K 27/008; A01K 27/009; F16B 2/12
See application file for complete search history.

(56) References Cited

U.S. PATENT DOCUMENTS

| 1,242,159 A | * | 10/1917 | Dunkleberger .... | A44B 17/0011 24/665 |
| 1,271,650 A | * | 7/1918 | Arkin ................... | A44B 11/266 24/657 |

(Continued)

FOREIGN PATENT DOCUMENTS

| DE | 202005013615 U1 | 11/2005 |
| JP | 1602690 S | 4/2017 |

OTHER PUBLICATIONS

Whistle FIT, published 2018 [online], [retrieved on Jul. 17, 2018], Available from internet, URL: <https://www.petinsight.com/whistle-fit/>, 5 pgs.

(Continued)

*Primary Examiner* — Robert Sandy
*Assistant Examiner* — Louis A Mercado
(74) *Attorney, Agent, or Firm* — Greenberg Traurig, LLP (57) ABSTRACT

An accessory assembly for coupling a unit to an animal band, having a support frame that includes a locking gap positioned on one end of the support frame, a latch protrusion positioned on the other end of the support frame, a proximally positioned receiving aperture, and a plurality of strap retention structures configured for coupling to at least one strap, the straps configured for coupling to an animal band. The accessory assembly further has a coupling latch having an actuator positioned on one end of the coupling latch and a locking mechanism positioned on the other end of the coupling latch opposite the actuator where the coupling latch is configured to be coupled to the support frame by placing the locking mechanism within the locking gap and positioning the actuator around the latch protrusion, and where the coupling latch is further configured to laterally move the locking mechanism.

19 Claims, 7 Drawing Sheets

(56) References Cited

U.S. PATENT DOCUMENTS

| | | | |
|---|---|---|---|
| 1,380,177 A * | 5/1921 | Arkin | A44B 17/0011 24/110 |
| 1,402,827 A * | 1/1922 | Arkin | A44B 17/0011 24/110 |
| 2,364,266 A * | 12/1944 | Bryce | A44B 1/34 24/356 |
| D242,675 S | 12/1976 | McNair | |
| 4,809,700 A | 3/1989 | Castelli et al. | |
| D300,678 S | 4/1989 | Barrault | |
| D349,864 S | 8/1994 | Dunlap et al. | |
| D410,206 S | 5/1999 | Slater | |
| D464,941 S | 10/2002 | Latto et al. | |
| D478,830 S | 8/2003 | So | |
| 6,805,460 B1 | 10/2004 | Zoller et al. | |
| D521,927 S | 5/2006 | Franck et al. | |
| D524,282 S | 7/2006 | Beasley et al. | |
| D535,281 S | 1/2007 | Yang | |
| D537,409 S | 2/2007 | Suzuki | |
| D558,209 S | 12/2007 | Ikeda et al. | |
| D575,289 S | 8/2008 | Kuo et al. | |
| D584,176 S | 1/2009 | Maruyama et al. | |
| D592,647 S | 5/2009 | L'Henaff et al. | |
| D594,404 S | 6/2009 | Kuo et al. | |
| D594,874 S | 6/2009 | Sheba et al. | |
| D608,277 S | 1/2010 | Cano et al. | |
| D609,636 S | 2/2010 | Jensen | |
| D625,262 S | 10/2010 | Lee et al. | |
| D627,718 S | 11/2010 | Houghton | |
| D656,096 S | 3/2012 | Sasada et al. | |
| D663,684 S | 7/2012 | Yang | |
| D663,685 S | 7/2012 | Yang | |
| D667,322 S | 9/2012 | Madrack | |
| D668,562 S | 10/2012 | Madrack | |
| D669,027 S | 10/2012 | Kumpula et al. | |
| D673,110 S | 12/2012 | Sasada et al. | |
| D673,908 S | 1/2013 | Koch | |
| 8,353,603 B2 | 1/2013 | Berry et al. | |
| D680,541 S | 4/2013 | Lee et al. | |
| D693,814 S | 11/2013 | Park | |
| D694,228 S | 11/2013 | Richter | |
| D698,376 S | 1/2014 | Funato et al. | |
| D704,634 S | 5/2014 | Eidelman et al. | |
| D706,321 S | 6/2014 | Oetlinger et al. | |
| D709,396 S | 7/2014 | Eidelman et al. | |
| D724,971 S | 3/2015 | Bailey et al. | |
| D725,511 S | 3/2015 | Read et al. | |
| D725,850 S | 3/2015 | Eidelman et al. | |
| D742,817 S | 11/2015 | Lammers-Meis et al. | |
| D744,658 S | 12/2015 | Hilkey-Boyatt | |
| D745,421 S | 12/2015 | Akana et al. | |
| D749,570 S | 2/2016 | Lee | |
| D761,138 S | 7/2016 | Manabe et al. | |
| D769,869 S | 10/2016 | Zhou et al. | |
| D772,745 S | 11/2016 | Henne et al. | |
| D774,651 S | 12/2016 | Kaib et al. | |
| D778,746 S | 2/2017 | Renganathan | |
| D780,238 S | 2/2017 | Kato | |
| D784,325 S | 4/2017 | Kim et al. | |
| D788,999 S | 6/2017 | Zinn et al. | |
| D797,100 S | 9/2017 | Wieser et al. | |
| D798,861 S | 10/2017 | Wieser et al. | |
| D800,085 S | 10/2017 | Shepher | |
| D800,721 S | 10/2017 | Kim et al. | |
| 9,861,080 B1 | 1/2018 | Hathway et al. | |
| D812,499 S | 3/2018 | Kuh et al. | |
| D815,061 S | 4/2018 | Wei | |
| D815,077 S | 4/2018 | Sibley et al. | |
| 9,949,459 B2 * | 4/2018 | Pattie | A47D 13/086 |
| D816,520 S | 5/2018 | Elrod et al. | |
| D817,558 S * | 5/2018 | Lee | D30/152 |
| D819,633 S | 6/2018 | Jun | |
| 10,021,946 B2 * | 7/2018 | Kaneko | A44B 11/266 |
| D828,189 S | 9/2018 | Benedetti | |
| D838,716 S | 1/2019 | Teng et al. | |
| D839,753 S | 2/2019 | Domke et al. | |
| D840,251 S | 2/2019 | Choi | |
| D841,005 S | 2/2019 | Lin | |
| D846,748 S | 4/2019 | Benedikter | |
| D850,627 S | 6/2019 | Purani et al. | |
| 2003/0116101 A1 | 6/2003 | Kim et al. | |
| 2006/0000194 A1 | 1/2006 | Duncan et al. | |
| 2007/0209604 A1 | 9/2007 | Groh et al. | |
| 2007/0221140 A1 | 9/2007 | Warren et al. | |
| 2009/0038670 A1 | 2/2009 | Shu | |
| 2014/0290013 A1 | 10/2014 | Eidelman et al. | |
| 2015/0020751 A1 | 1/2015 | Pattie et al. | |
| 2016/0150857 A1 * | 6/2016 | Botkus | A44B 11/2592 24/615 |
| 2017/0208775 A1 | 7/2017 | Van Curen et al. | |
| 2018/0098525 A1 | 4/2018 | Lee et al. | |

OTHER PUBLICATIONS

"Amazon.com, Inc. Web page, JPO's Prior Design Ref. No. HJ27044048", Date first available, Oct. 5, 2015, 7 pages.

"Whistle 3 GPS Pet Tracker & Activity, Available for sale Jun. 8, 2007 [online]", Amazon.com, [Retrieved on Jul. 1, 2018], Available from internet Url:<https://www.amazon.com/dp/b01n7mwkwy/ref=sspa_dk_detail_1?pcs=1, 9 pages.

* cited by examiner

ACCESSORY ASSEMBLY FOR COUPLING A UNIT TO AN ANIMAL BAND

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The embodiments described in the disclosure relate to the field of accessory assemblies and specifically, to an accessory assembly designed to couple a portable unit to an animal band.

Various accessories connected to animal collars are currently known in the art. For example, many owners supply pets with identification tags to aid retrieval in the event an animal is lost or strays. Typically, such tags are attached to collars via key ring or split ring design wherein a circular hole within the tag is connected to a ring attached to the collar via the split ring. Alternative designs include "thread-through" designs wherein an attachment contains two slit-shaped receptacles on either end of the attachment allowing a collar to be "thread through" the attachment. Alternative designs also include "clasp" designs wherein a clasp is design to clip onto a collar. Often, these clips are formed as part of the attachment itself.

The current state of the art suffers from numerous deficiencies. First, split ring designs are incapable of supporting heavier loads without injury to pets. Thus, are impractical for attachments exceeding a trivial weight. For example, the disclosure describes embodiments that may be used with GPS trackers for pets, which cannot be utilized with split ring designs due to weight restrictions. Additionally, thread-through or clasps designs are impractical for advanced attachments as such designs either require the replacement of an existing collar and are required to be replaced with each device, thus resulting in significant waste. Further, many designs additionally lack a locking mechanism designed to lock an attachment in place.

BRIEF SUMMARY

To remedy the aforementioned deficiencies, the disclosure presents an accessory assembly for coupling a unit to an animal band.

In one embodiment, the accessory assembly comprises a support frame, the support frame including a locking gap positioned on one end of the support frame, a latch protrusion positioned on the other end of the support frame, a proximally positioned receiving aperture, and a plurality of strap retention structures configured for coupling to at least one strap, the straps configured for coupling to an animal band. The accessory assembly further comprises a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

In one embodiment, the accessory assembly comprises a support frame, the support frame including a locking gap positioned on one end of the support frame, a latch protrusion positioned on the other end of the support frame, a proximally positioned receiving aperture, and two anchors extending from the support frame oppositely opposed and spaced apart forming a gap designed to receive an end of a strap, wherein each anchor includes a retention aperture, the strap configured for coupling to an animal band and including at least one retention protrusion, the retention protrusion configured to be inserted into a retention aperture. The accessory assembly further comprises a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

In one embodiment, the accessory assembly comprises a support frame, the support frame including a locking gap positioned on one end of the support frame, a latch protrusion positioned on the other end of the support frame, a proximally positioned receiving aperture, and at least two strap insert slots configured to receive at least one strap, the straps configured for coupling to an animal band. The accessory assembly further comprises a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1A:
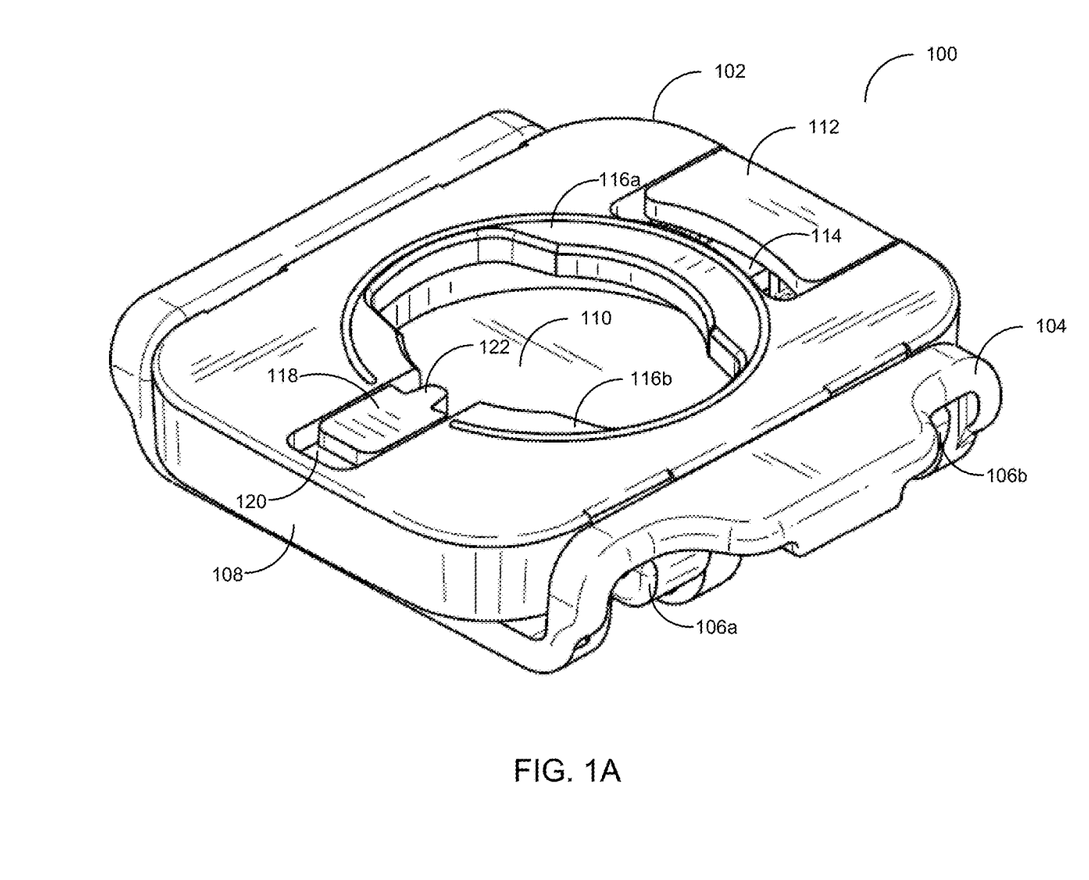
FIG. 1A depicts a perspective view of an accessory assembly according to some embodiments of the disclosure.

FIG. 1A depicts a perspective view of an accessory assembly according to some embodiments of the disclosure.

As illustrated in FIG. 1A, an accessory assembly 100 includes a support frame 102 and a strap 104. In one embodiment, support frame 102 may comprise a hard plastic structure designed to retain external devices via the receiving aperture formed between latch collars 116a and 116b. In one embodiment, strap 104 may comprise an elastic structure formed from rubber or other suitably elastic material. In one embodiment, strap 104 may be attached to support frame 102 by a user via strap retention structures, such as structures 106a and 106b.

In the illustrated embodiment, strap 104 is coupled to support frame 102 via strap retention structures 106a and 106b. In one embodiment, strap 104 is designed to wrap the bottom face of support frame 102 and allow for the insertion of a retaining member, perpendicularly with respect to strap 104. For example, strap 104 may be designed to receive the collar of an animal between strap 104 and support frame 102.

Figure 1B:
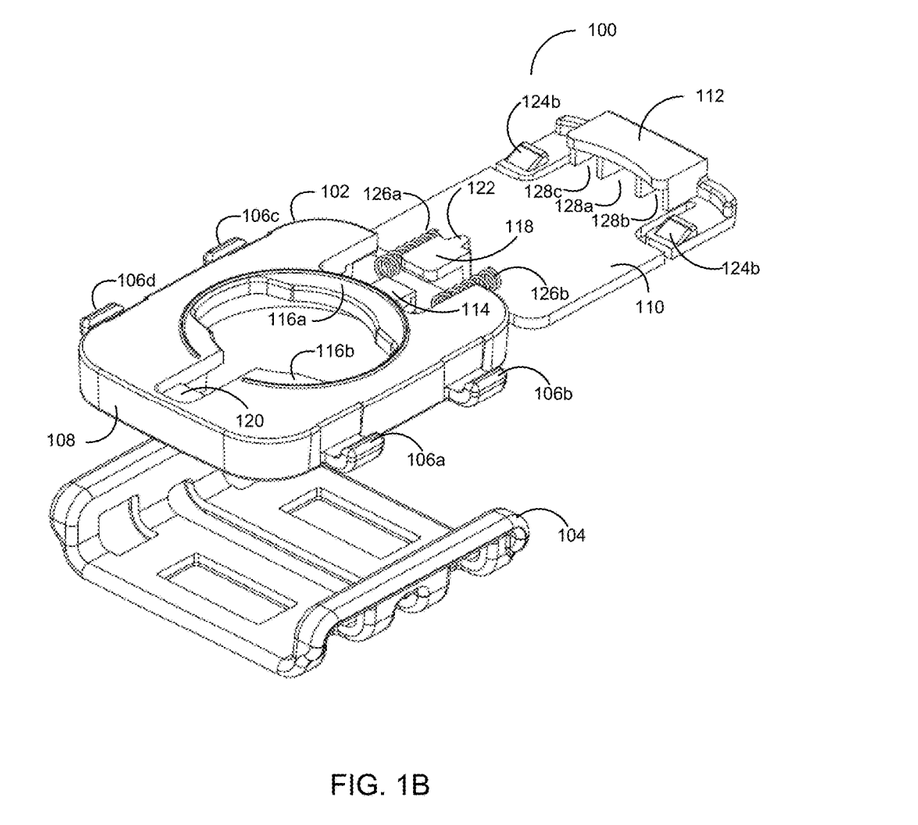
FIG. 1B depicts an exploded view of an accessory assembly according to some embodiments of the disclosure.

As illustrated in more detail with respect to FIG. 1B, support frame 102 may include multiple strap retention structures. Although illustrating only two strap retention structures 106a, 106b, support frame 102 includes two additional strap retention structures placed opposite strap retention structures 106a, 106b.

Strap retention structures 106a, 106b may comprise "J-shaped" protrusions extending outward and upward from support frame 102 and may be fused to support frame 102. In the illustrated embodiment, the J-shaped structure of strap retention structures 106a, 106b creates a gap between the distal end of strap retention structures 106a, 106b and support frame 102, as illustrated more clearly in FIG. 1B. The gap formed between strap retention structures 106a, 106b and support frame 102 allows for the attachment of strap 104 to support frame 102.

As illustrated, support frame 102 includes an upper portion 108 and a coupling latch 110. In one embodiment, coupling latch 110 includes a planar portion removeably coupled to the upper portion 108 of support frame 102 and a plurality of engaging members discussed more fully herein.

Coupling latch 110 includes an actuator 112. In one embodiment, actuator 112 may comprise an L-shaped vertical protrusion fused to coupling latch 110, as illustrated in more detail with respect to FIG. 1B. In the illustrated embodiment, actuator 112 allows for the manipulation of coupling latch 110 with respect to the upper portion 108. Specifically, actuator 112 allows for coupling latch 110 to be slid into support frame 102 along a single axis. Movement of the coupling latch 110 with respect to the support frame 102 is described in more detail with respect to FIG. 1B.

Upon manipulation of coupling latch 110 using actuator 112, the actuator may be engaged with latch protrusion 114. In one embodiment, latch protrusion 114 may be coupled or fused to support frame 102 and may comprise a horizontal protrusion extending outward away from latch collar 116a. As illustrated in more detail with respect to FIG. 1B, actuator 112 may be configured to include a receptacle designed to receive latch protrusion 114. Thus, when exerting an inward force via actuator 112, actuator 112 may be aligned and coupled to latch protrusion 114 via the receptacle.

Coupling latch 110 additionally includes a locking mechanism 118 situated within locking gap 120. During operation, locking mechanism 118 may move laterally within locking gap 120 upon operation of the actuator 112. That is, when a user exerts force on actuator 112 toward latch color 116a, locking mechanism 118 may equally be displaced away from latch collar 116a. Movement of coupling latch 110 may be facilitated via a spring-loaded mechanism placed between actuator 112 and upper portion 108 as illustrated in FIG. 1B.

Locking mechanism 118 may include a lock 122. In the illustrated embodiment, lock 122 may comprise a planar protrusion extending inward toward latch collar 116a and outward from latch collar 116b. In operation, when a force is exerted on actuator 112 toward latch collar 116, the lock 122 may be displaced away from latch collars 116a and 116b. In this operation, the surface of latch collar 116b may be sufficiently curved, allowing for rotational movement of an insertion member (not illustrated). In one embodiment, rotational movement of the insertion member may also comprise rotational movement of latch collars 116a, 116b. Upon removal of the force on actuator 112, the lock 122 may be displaced inward toward latch collar 116a and away from latch collar 116b. In this operation, the lock 122 may extend beyond the curved surface of latch collar 116b. In one embodiment, an insertion member (not illustrated) may include a lock receptacle designed to hold lock 122. Thus, when properly positioned, removal of the force on actuator 112 may result in the lock 122 being received by a lock receptacle present on an insertion member, thus retaining the insertion member.

FIG. 1B depicts an exploded view of an accessory assembly according to some embodiments of the disclosure.

As illustrated in FIG. 1B, coupling latch 110 is removed from support frame 102, thus illustrating additional structures present in some embodiments of coupling latch 110.

Coupling latch 110 may include a plurality of wedges 124a, 124b. In the illustrated embodiment, wedges 124a and 124b may be inserted into respective wedge receptacles on the underside of support frame 102. Thus, in operation, wedges 124a and 124b may be slide under support frame 102 and inserted into wedge receptacles such that coupling latch 110 is positioned flush with support frame 102.

As illustrated in FIG. 1B, actuator 112 may include one or more openings 128a, 128b, and 128c. In one embodiment, opening 128a may be configured to receive latch protrusion 114 while openings 128b and 128c may be configured to receive compression springs 126b and 126a, respectively. In the illustrated embodiment, compression springs 126a and 126b are placed between coupling latch 110 and support frame 102, specifically between actuator 112 and the vertical sidewall of support frame 102. In one embodiment, compression springs 126a and 126b may be fixedly attached either to the vertical sidewall of support frame 102 or to actuator 112 (via openings 128b and 128c). In alternative embodiments, compression springs 126a and 126b may not be physically connected to the vertical side wall of support frame 102 or to actuator 112 and instead may be rested on coupling latch 110 (or within openings 128b and 128c) prior to the coupling of coupling latch 110 into support frame 102.

As discussed previously, the use of compression springs 126a and 126b allows the assembly 100 to be retained in a "locked" position until a force is applied to actuator 112. That is, during operation, a user inserts coupling latch 110 into support frame 102 until wedges 124a and 124b engage wedge receptacles on the bottom side of support frame 102. Thus, upon activation of wedges 124a and 124b, the compression springs 126a and 126b are partially compressed and apply an outward force on actuator 112, which is counteracted by positioning of the wedges 124a and 124b. In this state, the lock 122 positioned on lock mechanism 118 extends past the curved surface of latch collar 116b, thus preventing rotational movement of an insertion member.

Subsequently, if a user attempts to rotate the insertion member with respect to latch collars 116a and 116b, the user must exert an inward force on actuator 112. Upon exertion of this force, compression springs 126a and 126b may be compressed further and lock mechanism 118 (including lock 122) may be forced outward from latch collar 116b, thus removing lock 122 from the curved plane formed by latch collar 116b. Thus, upon activation of the actuator 112, the curved surfaces of both latch collars (116a and 116b) are unbroken and a circular insertion member may be rotated and positioned.

Upon release of actuator 112, the compression springs 126a and 126b decompress, thus forcing lock mechanism 118 (and lock 122) inward. Prior to releasing actuator 112, the user may properly position the insertion member such that a lock receptacle is aligned with lock 122 and receives lock 122 into the lock receptacle. Upon insertion of the lock 122 into the lock receptacle, the insertion member may be fixed retained and may not be rotated while actuator is not depressed. Alternatively, lock 122 may be configured to prevent upward movement of the insertion member, thus forming a gate-like lock.

Figure 1C:
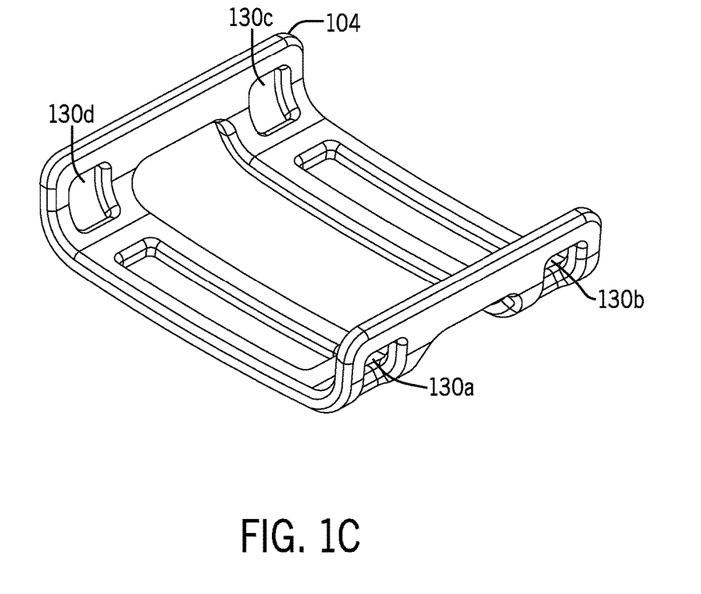
FIG. 1C depicts a strap of an accessory assembly according to some embodiments of the disclosure.

FIG. 1C depicts a strap of an accessory assembly according to some embodiments of the disclosure. As discussed previously, an accessory assembly 100 may be equipped with strap retention structures 106a, 106b in order to retain a strap connected to the assembly. As illustrated in FIG. 1C, a strap 104 may include a plurality of strap retainer receptacles 130a, 130b, 130c, and 130d. In one embodiment, strap 104 may comprise an elastic or substantially elastic material such as rubber, allowing for the strap to be deformed in order to allow strap retention structures (e.g., 106a, 106b) to engage within strap retainer receptacles 130a, 130b, 130c, and 130d. Alternatively, or in conjunction with the foregoing, strap 104 may be sized sufficient to allow for the passage of a retaining member positioned perpendicular to strap retainer receptacles 130a, 130b, 130c, and 130d and between strap 104 and the accessory assembly.

In one embodiment, the retaining member may comprise a collar designed for use by an animal. In this embodiment, the collar may be positioned on the backside of the assembly and the strap 104 may be positioned on top of the collar. Next, the strap retainer receptacles 130a, 130b, 130c, and 130d may be stretched outward from the collar and placed on the strap retention structures, thus wrapping the collar between the strap 114 and the accessory assembly and retaining the assembly to the collar.

Figure 2A:
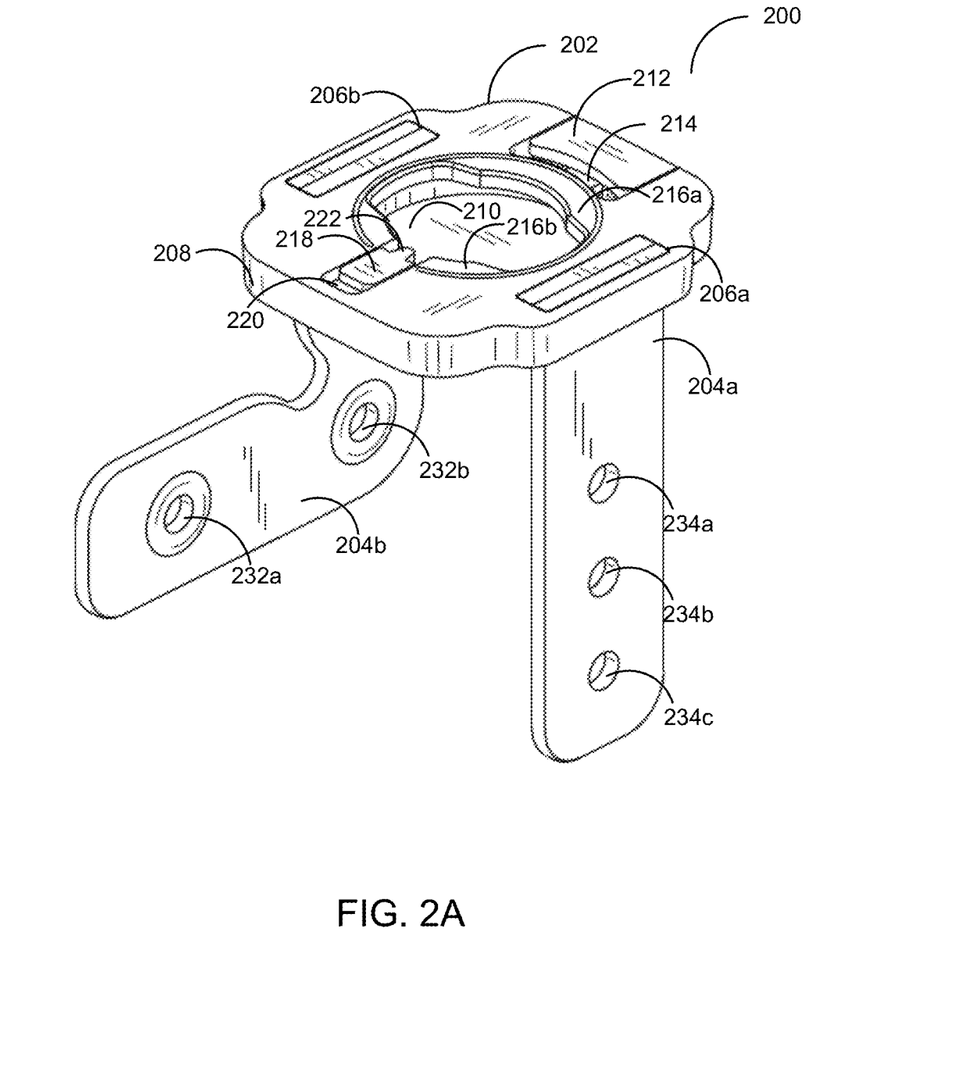
FIG. 2A depicts a perspective view of an accessory assembly according to some embodiments of the disclosure.

FIG. 2A depicts a perspective view of an accessory assembly according to some embodiments of the disclosure.

As illustrated in FIG. 2A, an accessory assembly 200 includes a support frame 202 including an upper portion 208 and a coupling latch 210. The accessory assembly 200 may further include an actuator 212, latch 214, latch collars 216a and 216b, locking mechanism 218, gap 220, and lock 222. These potions of assembly 200 may be configured and manufactured in a manner substantially similar to the equivalent elements in assembly 100 illustrated in FIGS. 1A through 1C, the description of which is not repeated herein for the sake of clarity.

As illustrated in FIG. 2A, the assembly 200 includes strap retention structures in the form of strap insert slots 206a and 206b. These insert slots 206a and 206b may comprise hollow portions extending from the top side of support frame 202 to the bottom side of support frame 202 and may receive straps 204a and 204b. In one embodiment, a user may thread straps 204a and 204b from the top side of support frame 202 through insert slots 206a and 206b to the bottom side of support frame 202. Strap insert slots 206a and 206b are discussed more fully with respect to FIG. 2B.

Straps 204a and 204b may additionally include a plurality of eyelets 232a, 232b, 234a, 234b, 234c. In one embodiment, eyelets 232a, 232b, 234a, 234b, 234c may be utilized to secure the assembly to a retaining member. In one embodiment, the retaining member may comprise a collar for use on an animal. For example, in order to affix the assembly to a collar, a user may place the collar adjacent to the coupling latch 210 and between the straps 204a, 204b. The use may then fold strap 204b inward and over the collar such that eyelet 232b is adjacent to the collar and the collar is situated between strap 204b and coupling latch 210. Next, the user may fold strap 204a inward and align one of eyelets 234a, 234b, or 234c with eyelet 232b. Finally, the user may fold the distal half of strap 204b inward, over strap 204a, aligning eyelet 232a with the selected eyelet 234a, 234b, or 234c. To secure the straps, a retaining apparatus may be threaded through the eyelets 232a, 232b, 234a, 234b, 234c. In one embodiment, the retaining apparatus may comprise an external corded device. Alternatively, the retaining apparatus may comprise a portion of collar capable of threading each of the eyelets 232a, 232b, 234a, 234b, 234c.

Figure 2B:
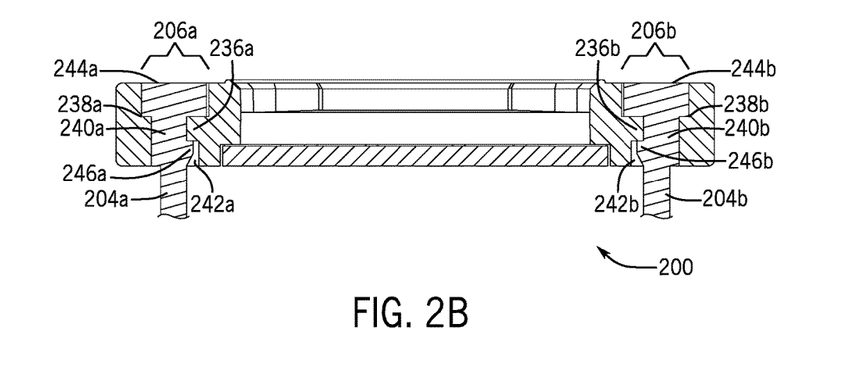
FIG. 2B depicts a cutaway view of an accessory assembly according to some embodiments of the disclosure.

FIG. 2B depicts a cutaway view of an accessory assembly according to some embodiments of the disclosure.

As illustrated in FIG. 2B, strap insert slots 206a and 206b comprise an opening extending from the top side of the support frame 202 to the bottom side of support frame 202. In alternative embodiments, strap retention structures 206a and 206b may only extend partially through support frame 202.

Within a strap insert slot 206a, a first ledge 236a extends outwardly into the strap insert slot 206a while a second ledge 238a extends inwardly into the strap insert slot 206a. In the illustrated embodiment, a gap 240a is formed between the ledges 236a, 236b enabling the insertion of strap 204a. Strap insert slot 206a further includes a retaining recess 242a which enables the retention of strap 204a. In one embodiment, the retaining recess 242a may comprise a rectangular recess extending inwardly into support frame 202.

As illustrated in FIG. 2B, the straps 204a and 204b are configured to retain their positions when inserted into strap retention structures 206a, 206b. Specifically, each strap 204a, 204b includes a strap end 244a, 244b. In one embodiment, the strap end 244a, 244b may comprise a structure extending laterally over the primary mass of strap 204a, 204b. For example, strap end 244a, 244b may form a "T-shaped" connection as illustrated in FIG. 2B.

Strap 204a, 204b additionally includes a retaining wedge 246a, 246b, respectively. In one embodiment, retaining wedge 246a, 246b may comprise a quadrilateral protrusion extending inward from strap 204a, 204b, to support frame 202. In one embodiment, retaining wedge 246a, 246b comprises at least one sloped portion and at least on rectangular portion. The use of a slope portion in retaining wedge 246a, 246b allows for strap 204a, 204b to be easily inserted into strap insert slots 206a, 206b while resisting removal from strap insert slots 206a, 206b. In other embodiments, barb-like structures may be utilized for retaining wedge 246a, 246b. in alternative embodiments, the lower potion of retaining wedge 246a, 246b may extend beyond the bottom side of support frame 202 and may allow for the depression of retaining wedge 246a, 246b. In this embodiment, placing pressure on the retaining wedge 246a, 246b externally from the center of the apparatus may allow for the removal of straps 204a, 204b.

Figure 3A:
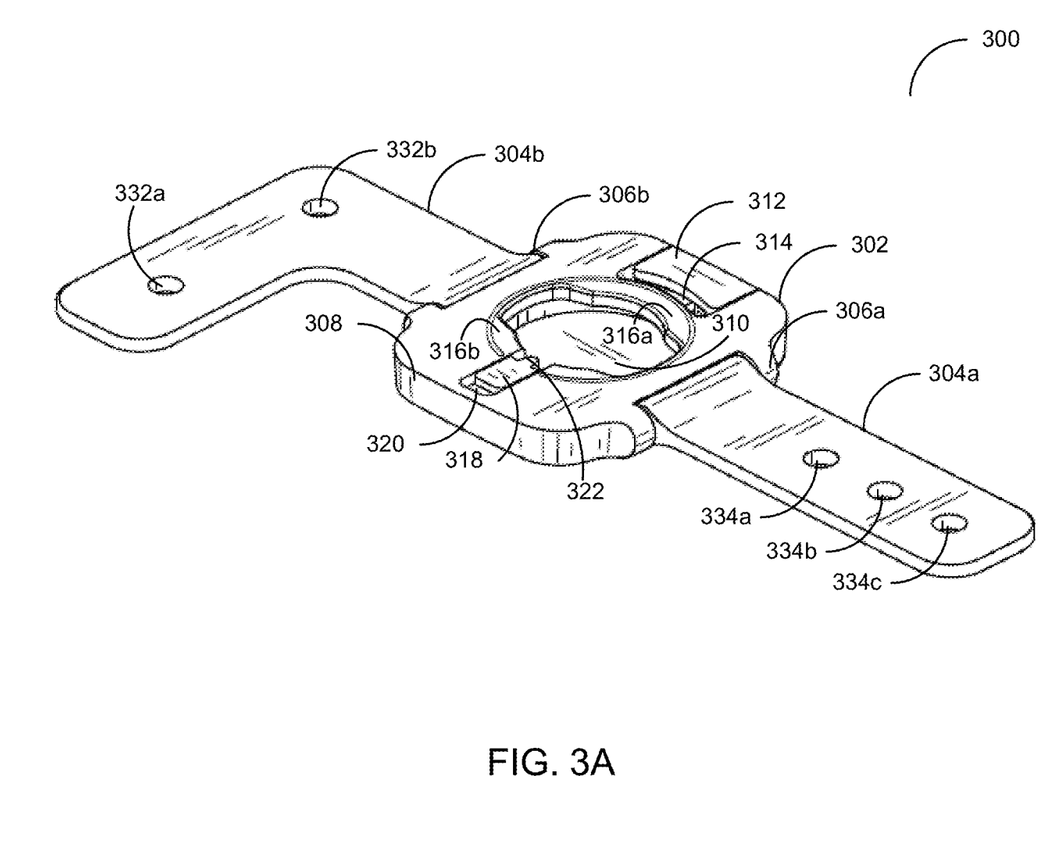
FIG. 3A depicts a perspective view of an accessory assembly according to some embodiments of the disclosure.

FIG. 3A depicts a perspective view of an accessory assembly according to some embodiments of the disclosure.

As illustrated in FIG. 3A, an accessory assembly 300 includes a support frame 302 including an upper portion 308 and a coupling latch 310. The accessory assembly 300 may further include an actuator 312, latch 314, latch collars 316a and 316b, locking mechanism 318, gap 320, and lock 322. These potions of assembly 300 may be configured and manufactured in a manner substantially similar to the equivalent elements in assembly 100 illustrated in FIGS. 1A through 1C, the description of which is not repeated herein for the sake of clarity.

As illustrated in FIG. 3A, the assembly 300 includes strap retention structures 306a and 306b. These structures 306a and 306b may comprise a pair of anchors forming a gap to receive straps 304a, 304b. In one embodiment, a user may connect straps 304a and 304b to the structures 306a, 306b by inserting a portion of the strap within an aperture present within each anchor. Strap retention structures 306a and 306b are discussed more fully with respect to FIG. 3B.

Straps 304a and 304b may additionally include a plurality of eyelets 332a, 332b, 334a, 334b, 334c. In one embodiment, eyelets 332a, 332b, 334a, 334b, 334c may be utilized to secure the assembly to a retaining member. In one embodiment, the retaining member may comprise a collar for use on an animal. For example, in order to affix the assembly to a collar, a user may place the collar adjacent to the coupling latch 310 and between the straps 304a, 304b. The use may then fold strap 304b inward and over the collar such that eyelet 332b is adjacent to the collar and the collar is situated between strap 304b and coupling latch 310. Next, the user may fold strap 304a inward and align one of eyelets 334a, 334b, or 334c with eyelet 332b. Finally, the user may fold the distal half of strap 304b inward, over strap 304a, aligning eyelet 332a with the selected eyelet 334a, 334b, or 334c. To secure the straps, a retaining apparatus may be threaded through the eyelets 332a, 332b, 334a, 334b, 334c. In one embodiment, the retaining apparatus may comprise an external corded device. Alternatively, the retaining apparatus may comprise a portion of collar capable of threading each of the eyelets 332a, 332b, 334a, 334b, 334c.

Figure 3B:
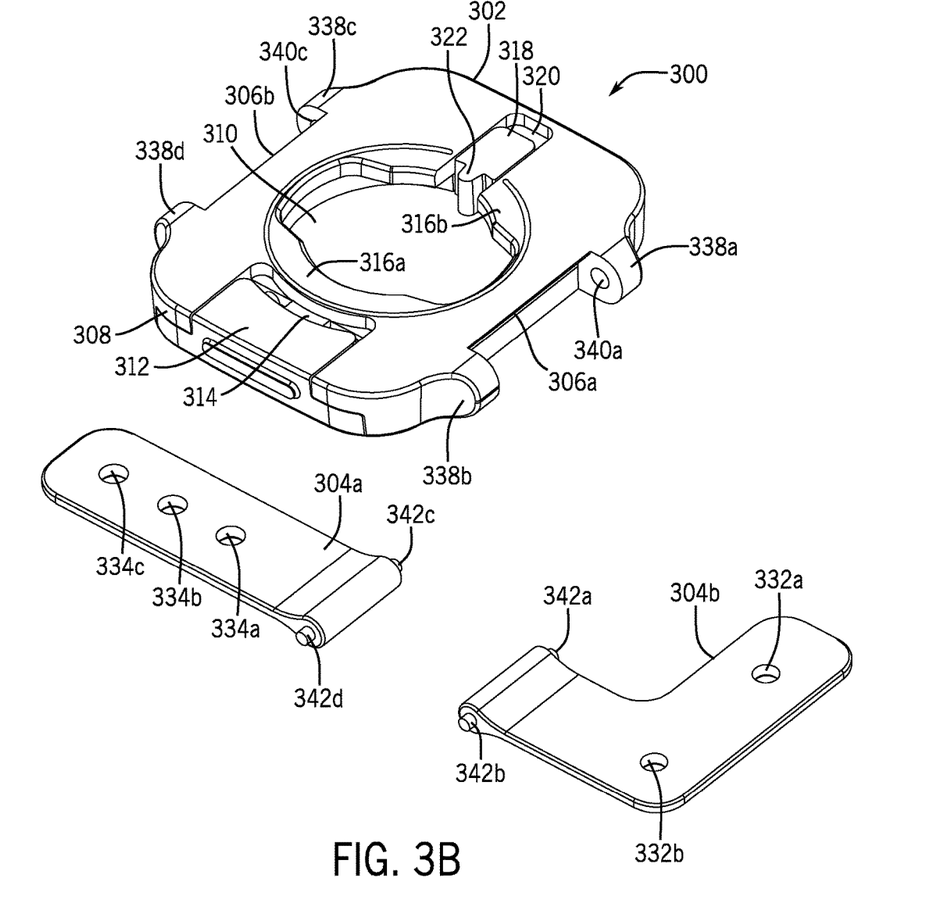
FIG. 3B depicts an exploded view of an accessory assembly according to some embodiments of the disclosure.

FIG. 3B depicts an exploded view of an accessory assembly according to some embodiments of the disclosure.

As illustrated in FIG. 3B, an accessory assembly may include multiple strap retention structures 306a, 306b. In one embodiment, strap retention structures 306a, 306b may be positioned on opposite ends of assembly 300. In one embodiment, strap retention structures 306a, 306b may be placed perpendicular to the coupling latch of the assembly 300.

Each strap retention structure 306a, 306b includes two anchors 338a-d extending from the support frame 302 oppositely opposed and spaced apart forming a gap. Each anchor 338a-d includes a retention aperture, as illustrated by retention aperture 340a, 340c. In one embodiment, retention aperture 340a, 340c may comprise a semi-circular or cylindrical cavity placed within an anchor. In other embodiments, retention aperture 340a, 340c may be shaped according to a retention portion of a strap, as discussed below.

Straps 304a, 304b include an end portion containing retention protrusions 342a, 342b, 342c, and 342d. In one embodiment, retention protrusions 342a, 342b, 342c, 342d comprise cylindrical protrusions extending outwardly from the midline of straps 304a, 304b. In the illustrated embodiment, retention protrusions 342a, 342b, 342c, 342d are designed to be coupled to retention apertures such retention aperture 340a, 340c. For example, strap 304a may be inserted into the gap formed by anchors 338a and 338b. In order to fixedly retain the strap 304a, the retention protrusions 342a and 342b may be placed within retention apertures (e.g., aperture 340a, 340c) located on the anchor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. An accessory assembly for coupling a unit to an animal band comprising:
   a support frame, the support frame including a locking gap positioned on one end of the support frame, a latch protrusion positioned on the other end of the support frame, a proximally positioned receiving aperture, and a plurality of strap retention structures configured for coupling to at least one strap, the at least one strap configured for coupling to an animal band; and
   a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

2. The accessory assembly of claim 1, wherein the plurality of strap retention structures comprises at least two band hooks positioned on generally opposite sides of the support frame extending from an outer edge of the support frame, wherein each of the band hooks is configured and arranged to engage at least a portion of the at least one strap.

3. The accessory assembly of claim 2, wherein at least one of the at least two band hooks comprises a generally J-shaped extension.

4. The accessory assembly of claim 2 wherein the at least one strap comprises at least one planar portion and at least two curved portions, each of the at least two curved portions comprising a strap retainer receptacle configured to be placed on the at least two band hooks.

5. The accessory assembly of claim 1, wherein the plurality of strap retention structures comprises two pairs of strap retention structures positioned extending from opposite sides of the support frame, and wherein each pair of strap retention structures comprises two anchors extending from the support frame oppositely opposed and spaced apart forming a gap, and wherein each anchor comprises at least one retention aperture configured for receiving at least a portion of a strap, the strap being at least partially positioned in the gap and coupled to the at least one retention aperture.

6. The accessory assembly of claim 1, wherein the plurality of strap retention structures comprises at least two strap insert slots, the insert slots positioned on opposite sides of the support frame and extending through at least a partial portion of the frame from a top side of the frame to a bottom side of the frame, and wherein at least one of the insert slots includes at least one ledge, the at least one ledge extending from at least one internal surface of the insert slot from adjacent the top side, and extending across at least a partial length and width of the at least one insert slot, the at least one ledge configured to support at least a portion of an inserted strap.

7. The accessory assembly of claim 6 wherein the at least one strap includes a T-shaped end portion and at least one retaining wedge, wherein the retaining wedge is configured to engage the at least one ledge.

8. The accessory assembly of claim 6 wherein the at least one strap includes a first strap and a second strap, wherein the first strap comprises an L-shaped strap and the second strap comprises a straight strap, and wherein both the first and second straps each contain one or more eyelets.

9. The accessory assembly of claim 1 further comprising a plurality of compression springs positioned between an accessory mount and the coupling latch.

10. The accessory assembly of claim 9 wherein the actuator includes an opening designed to receive the latch protrusion and a plurality of openings designed to receive the plurality of compression springs.

11. The accessory assembly of claim 1 wherein the locking mechanism further includes including a lock, the lock projecting inward toward the receiving aperture.

12. The accessory assembly of claim 11 wherein the support frame further includes a plurality of latch collars surrounding the receiving aperture.

13. The accessory assembly of claim 12 wherein the plurality of latch collars includes a first latch collar and a second latch collar wherein the second latch collar is adjacent to the locking mechanism and wherein the first latch collar is adjacent to the actuator.

14. The accessory assembly of claim 13 wherein the second latch collar includes an opening bisecting the second latch collar.

15. The accessory assembly of claim 14 wherein the opening bisecting the second latch collar is configured to receive the lock upon removing a force exerted on the actuator.

16. The accessory assembly of claim 1 wherein the at least one strap is constructed using an elastic material.

17. The accessory assembly of claim 1 wherein the coupling latch further comprises a plurality of wedges positioned on a top side of the coupling latch and adjacent to the actuator, wherein the wedges are configured to engage a plurality of wedge receptacles positioned on a bottom side of the support frame in response to an inward force exerted on the actuator toward the receiving aperture.

18. An accessory assembly for coupling a unit to an animal band comprising:
   a support frame, the support frame including a locking gap positioned on one end of the support frame, a latch protrusion positioned on the other end of the support frame, a proximally positioned receiving aperture, and two anchors extending from the support frame oppositely opposed and spaced apart forming a gap designed to receive an end of a strap, wherein each anchor includes a retention aperture, the strap configured for coupling to an animal band and including at least one retention protrusion, the retention protrusion configured to be inserted into a retention aperture; and a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

19. An accessory assembly for coupling a unit to an animal band comprising:

a support frame, the support frame including a locking gap positioned on one end of the support frame, a latch protrusion positioned on the other end of the support frame, a proximally positioned receiving aperture, and at least two strap insert slots, each configured to receive at least one strap, the straps configured for coupling to an animal band; and a coupling latch comprising an actuator positioned on one end of the coupling latch and a locking mechanism positioned on the other end of the coupling latch opposite the actuator wherein the coupling latch is configured to be coupled to the support frame by placing the locking mechanism within the locking gap and positioning the actuator around the latch protrusion, and wherein the coupling latch is further configured to laterally move the locking mechanism in response to a force applied to the actuator toward the receiving aperture.

* * * * *